United States Patent
Boegård et al.

(10) Patent No.: US 9,141,427 B2
(45) Date of Patent: Sep. 22, 2015

(54) ALLOCATING TASKS TO PERIPHERAL PROCESSING UNITS IN A HIERARCHICAL TREE TOPOLOGY BASED ON TEMPERATURE STATUS OF BRANCHES

(75) Inventors: Jonas Boegård, Sundbyberg (SE); Ulf Ekstedt, Saltsjöbaden (SE); Jan Roxbergh, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 233 days.

(21) Appl. No.: 13/457,853

(22) Filed: Apr. 27, 2012

(65) Prior Publication Data

US 2013/0275991 A1 Oct. 17, 2013

(30) Foreign Application Priority Data

Apr. 12, 2012 (EP) .................... 12164008

(51) Int. Cl.
- G06F 9/46 (2006.01)
- G06F 9/50 (2006.01)
- G06F 1/20 (2006.01)
- G06F 1/32 (2006.01)

(52) U.S. Cl.
CPC ........... *G06F 9/50* (2013.01); *G06F 1/206* (2013.01); *G06F 1/3203* (2013.01)

(58) Field of Classification Search
None
See application file for complete search history.

(56) References Cited

U.S. PATENT DOCUMENTS

| | | | |
|---|---|---|---|
| 6,199,173 B1* | 3/2001 | Johnson et al. | 714/4.12 |
| 6,826,456 B1* | 11/2004 | Irving et al. | 700/299 |
| 7,330,983 B2* | 2/2008 | Chaparro et al. | 713/300 |
| 7,562,243 B1* | 7/2009 | Ghose | 713/324 |
| 2002/0087903 A1* | 7/2002 | Hermerding et al. | 713/320 |
| 2003/0229662 A1 | 12/2003 | Luick | |
| 2005/0049729 A1* | 3/2005 | Culbert et al. | 700/50 |
| 2005/0166075 A1* | 7/2005 | Hack | 713/320 |
| 2006/0070074 A1 | 3/2006 | Maeda et al. | |
| 2008/0022076 A1 | 1/2008 | Krieger et al. | |
| 2008/0189517 A1 | 8/2008 | Singh et al. | |
| 2008/0303676 A1* | 12/2008 | Kettler et al. | 340/584 |

(Continued)

FOREIGN PATENT DOCUMENTS

| | | |
|---|---|---|
| EP | 1607833 A2 | 12/2005 |
| WO | 0029942 A1 | 5/2000 |

(Continued)

OTHER PUBLICATIONS

Extended European Search Report for European patent application 12164008.0 mailed Oct. 8, 2012, 7 pages.

*Primary Examiner* — Mengyao Zhe
*Assistant Examiner* — James J Lee
(74) *Attorney, Agent, or Firm* — Withrow & Terranova, PLLC (57) ABSTRACT

A method of allocating tasks in a node of a telecommunication network, wherein the node comprises a main processing unit which is configured to process tasks in association with one or more of a plurality of peripheral processing units, the peripheral processing units arranged in a hierarchical tree topology comprising one or more branches at one or more hierarchical levels. The method comprises the steps of: receiving a request to process a task; determining a temperature status of branches in the hierarchical tree topology, wherein the temperature status of a branch is related to the temperature of a processing unit coupled to the branch; and allocating the task to one or more processing units, based on the temperature status of the branches in the hierarchical tree topology.

21 Claims, 8 Drawing Sheets

(56) References Cited

U.S. PATENT DOCUMENTS

| | | | |
|---|---|---|---|
| 2009/0013258 A1* | 1/2009 | Hintermeister et al. | 715/736 |
| 2009/0083551 A1 | 3/2009 | Finkelstein et al. | |
| 2009/0099705 A1 | 4/2009 | Harris | |
| 2009/0100437 A1* | 4/2009 | Coskun et al. | 718/105 |
| 2009/0204789 A1* | 8/2009 | Gooding et al. | 712/28 |
| 2010/0030395 A1* | 2/2010 | Shimotono et al. | 700/300 |
| 2010/0131790 A1* | 5/2010 | Zhang et al. | 713/340 |
| 2010/0138530 A1* | 6/2010 | Brillhart et al. | 709/224 |
| 2011/0004791 A1* | 1/2011 | Kokubu et al. | 714/57 |
| 2011/0035072 A1* | 2/2011 | Jackson | 700/291 |
| 2011/0264937 A1* | 10/2011 | Meisner et al. | 713/323 |

FOREIGN PATENT DOCUMENTS

| | | | | |
|---|---|---|---|---|
| WO | WO/00/29942 | * | 5/2000 | G06F 9/38 |
| WO | 2009027153 A1 | | 5/2009 | |
| WO | WO/2010/077923 | * | 7/2010 | G06F 1/32 |

* cited by examiner

ALLOCATING TASKS TO PERIPHERAL PROCESSING UNITS IN A HIERARCHICAL TREE TOPOLOGY BASED ON TEMPERATURE STATUS OF BRANCHES

RELATED APPLICATIONS

This application claims the benefit of EP application No. 12164008.0, filed on 12 Apr. 2012, the disclosure of which is hereby incorporated herein by reference in its entirety.

FIELD OF THE DISCLOSURE

The present disclosure relates to an apparatus and method for allocating tasks in a node of a telecommunication network.

BACKGROUND

In electronic systems that utilize processing units, for example a base station of a telecommunication network, overheating can occur in central processing units (CPUs), or digital signal processing units (DSPs), or other processing circuits.

Figure 1:
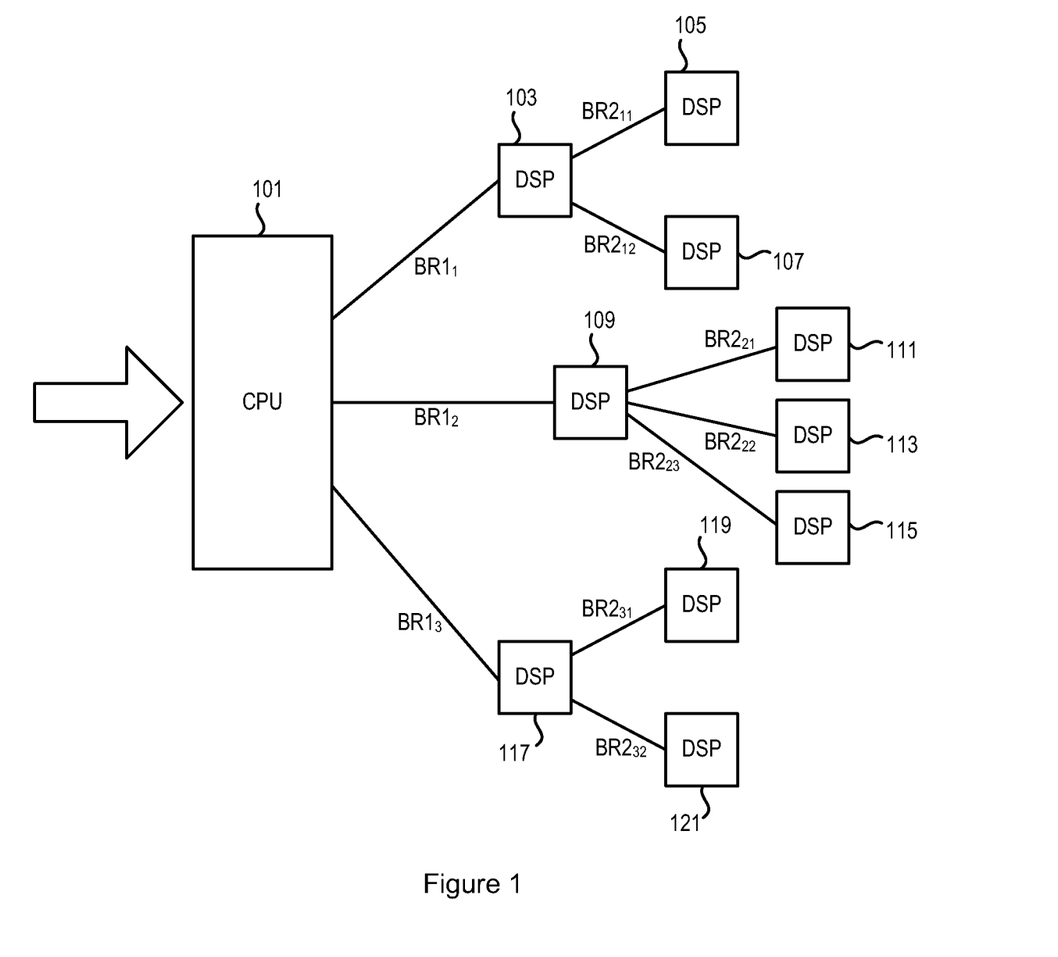
FIG. 1 shows a typical hierarchical tree topology of a node of a telecommunications network.

FIG. 1 is an example of a typical base station node, comprising a main processing unit 101 and a plurality of peripheral processing units 103 to 121 (for example DSPs) arranged in a hierarchical tree topology. Processing units 103, 109 and 117 are connected to the main processing unit 101 via branches $BR1_1$, $BR1_2$ and $BR1_3$, respectively. The processing units 103, 109 and 117 and the branches $BR1_1$ to $BR1_3$ can be considered as a first hierarchical level. The remaining processing units and respective branches are connected in a second hierarchical level.

If any of the processing units shown in FIG. 1 become overloaded, cooling systems are commonly used to reduce the occurrence of hotspots.

There are several known ways to cool a CPU, DSP or hotspot. The simplest is to supply a fixed amount of air (air flow) over the CPU, DSP or hotspot, such that heat energy is convectively transported away from the CPU, DSP or hotspot.

More complex systems use sensors for measuring the temperature of one or several CPUs, DSPs or hotspots, such that the amount of cooling can be controlled accordingly. For example, if a high temperature is detected, the cooling operation can be increased (for example by increasing the flow of air and/or supplying cooler air). Likewise, if a lower temperature is detected, then less cooling can be provided (for example by decreasing the flow or air, i.e. airspeed, and/or air temperature).

In the simplest solution, the cooling system is oversized (has excess cooling capacity), leading to inefficient cooling. Another disadvantage of such oversized cooling systems is the high level of noise associated with large cooling systems.

In more complex situations such as radio base stations, other problems may arise. For example, in the case where no more airflow is available (for example because cooling fans are running at maximum capacity), there is no way of decreasing the temperature, other than shutting down the entire radio base station. This type of emergency shutdown may be catastrophic with respect to a communication system, especially if multiple radio base stations shut down on a single hot day. Alternatively, some form of energy consuming device (such as an air conditioner) can be used to lower the temperature of the incoming air.

To prevent catastrophic shut downs, conventional cooling systems are designed with large engineering safety margins in order to handle very high ambient temperatures that might be very rare (such as the hottest day in August). Such conventional systems have the disadvantage of having to be oversized for a particular application.

SUMMARY

It is an aim of the present disclosure to provide a method and apparatus which obviate or reduce at least one or more of the disadvantages mentioned above.

According to a first aspect of the present disclosure, there is provided a method of allocating tasks in a node of a telecommunication network, wherein the node comprises a main processing unit which is configured to process tasks in association with one or more of a plurality of peripheral processing units, the peripheral processing units arranged in a hierarchical tree topology comprising one or more branches at one or more hierarchical levels. The method comprises the steps of receiving a request to process a task, determining a temperature status of branches in the hierarchical tree topology, wherein the temperature status of a branch is related to the temperature of a processing unit coupled to the branch. The task is allocated to one or more processing units based on the temperature status of the branches in the hierarchical tree topology.

The step of allocating the task may comprise the step of directing the task to a processing unit that forms part of a branch that is indicated as having a low temperature status (or alternatively, that is not indicated as having a high temperature status).

The step of allocating the task may comprise the step of temporarily preventing a task from being allocated to a processing unit that forms part of a branch that is indicated as having a high temperature status.

The step of allocating the task may comprise the step of delaying the admission of the task to any processing unit for processing.

According to one embodiment, the method comprises the step of maintaining a temperature status register, wherein the temperature status register comprises a list of temperature status information for respective branches in the hierarchical tree topology.

The temperature status register may comprise a list of branches which are indicated as having a high-temperature status.

A branch indicated as having a high-temperature status may be temporarily removed from the hierarchical tree topology for the purpose of allocating new tasks.

A processing unit in a high-temperature branch may be caused to be placed in a standby or sleep mode. A processing unit may be placed in a standby or sleep mode after completing an existing task.

A power management signal may be received for disabling one or more branches in the hierarchical tree topology.

According to another aspect of the disclosure, there is provided a method in a processing unit of a node of a telecommunications network, wherein the node comprises a main processing unit which is configured to process tasks in association with one or more of a plurality of peripheral processing units, the peripheral processing units arranged in a hierarchical tree topology comprising one or more branches. The method comprises the steps of comparing the temperature of the processing unit with a first threshold value, determining if the temperature of the processing unit has risen above the first threshold value. If so, a high-temperature indication is sent to a temperature status register, the high temperature indication indicating that the processing unit forms part of a branch having a high temperature.

According to another aspect of the present disclosure, there is provided a node of a telecommunication network. The node comprises a main processing unit and a plurality of peripheral processing units, the peripheral processing units arranged in a hierarchical tree topology comprising one or more branches at one or more hierarchical levels. The main processing unit comprises a receiving unit for receiving a request to process a task, and a selecting unit adapted to select one or more processing units that have processing capacity to process the task. A comparator unit of the main processing unit is adapted to determine a temperature status of the branches having a selected processing unit. An allocating unit is adapted to allocate the task to one or more processing units, based on the temperature status of the branches.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 2:
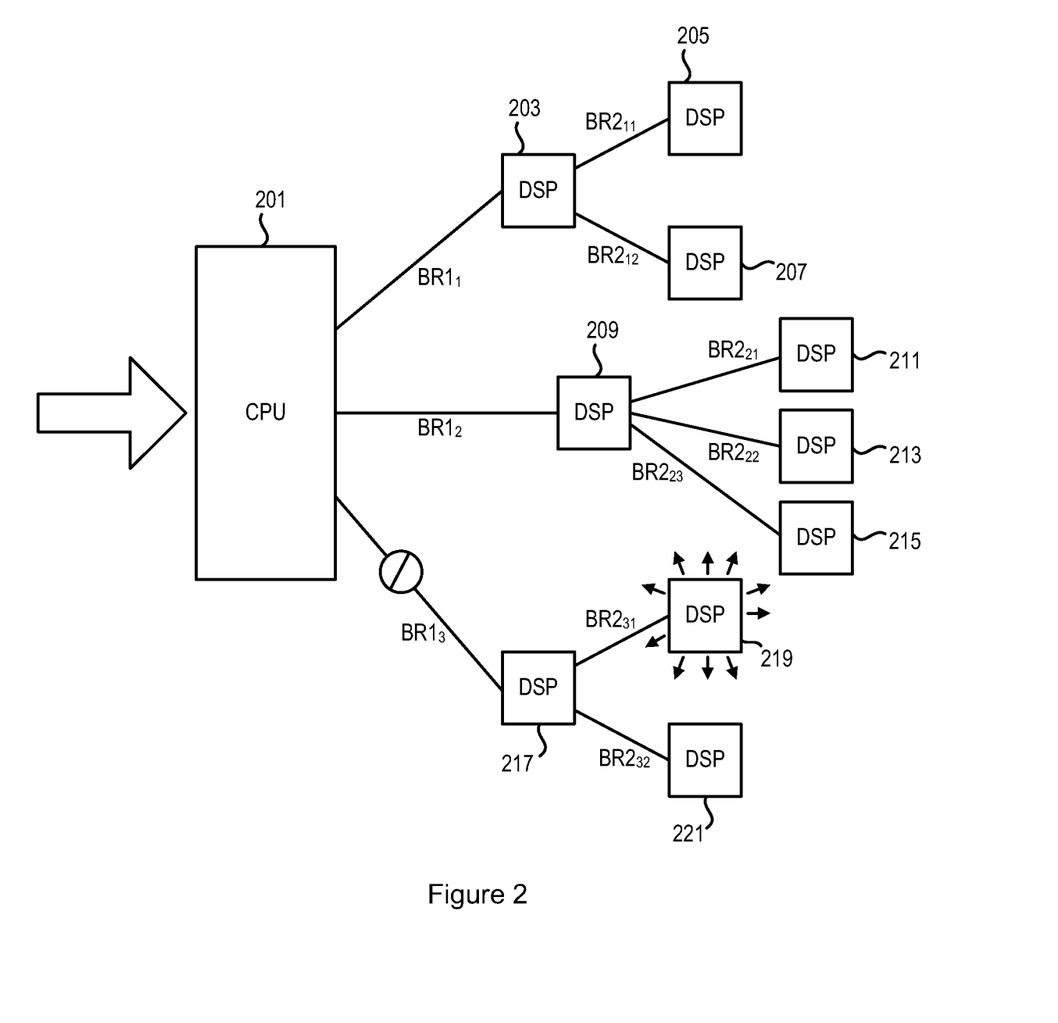
FIG. 2 shows a node according to an embodiment of the present disclosure.
Figure 3:
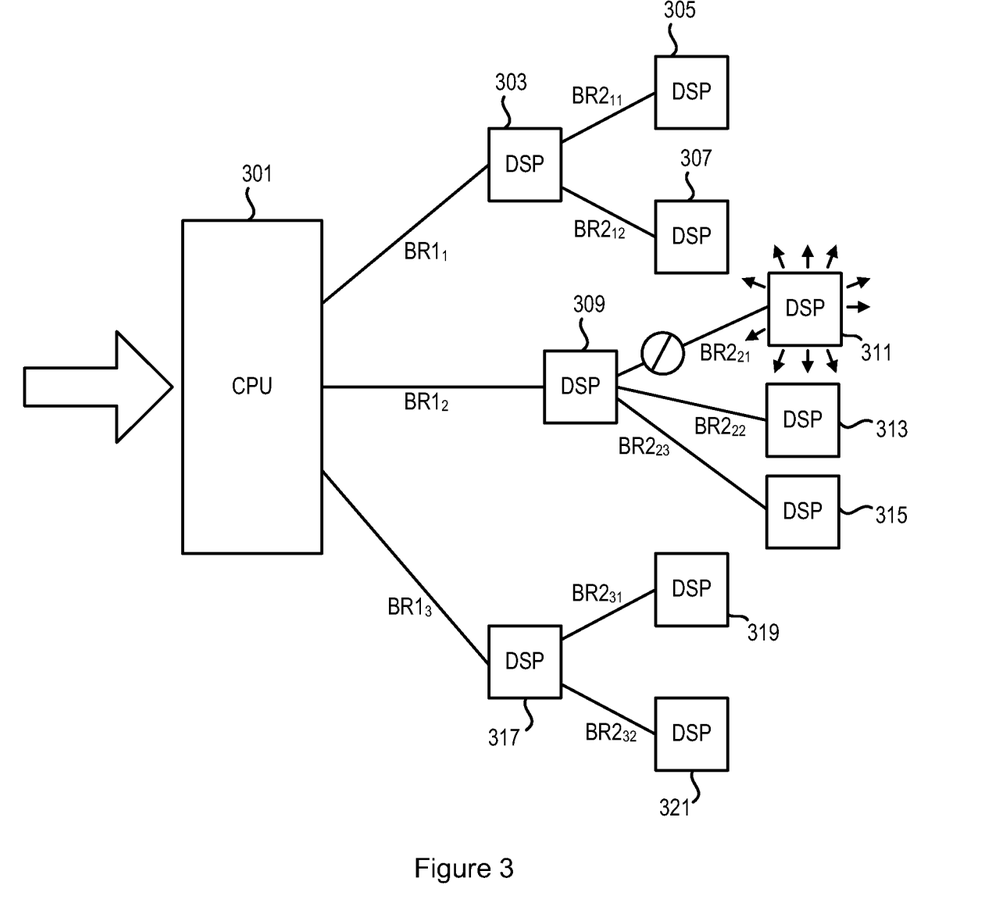
FIG. 3 shows a node according to another embodiment of the present disclosure.
Figure 4:
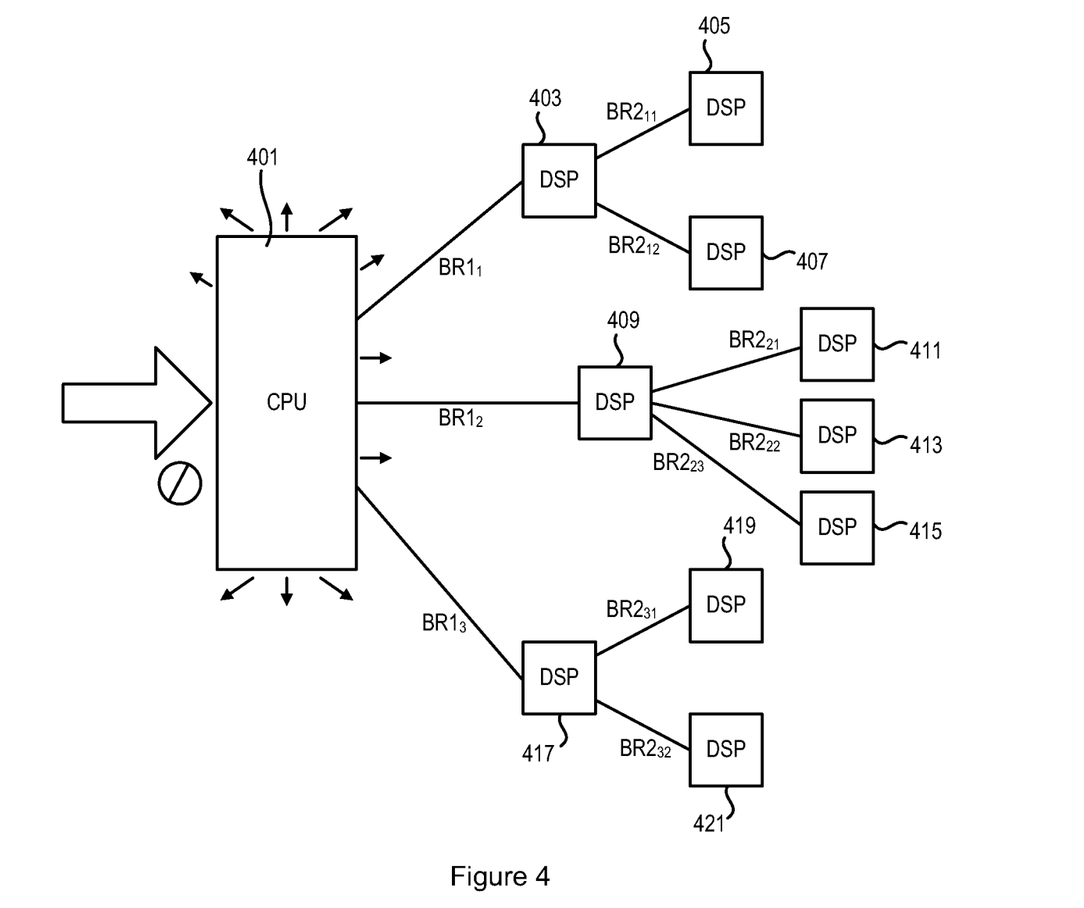
FIG. 4 shows a node according to another embodiment of the present disclosure.

FIG. 1, as discussed above, shows a typical hierarchical tree topology of a node of a telecommunications network;

FIGS. 2 to 4 provide examples of how embodiments of the present disclosure may be used to allocate tasks within a node of a telecommunication network, with FIGS. 5 to 8 providing further details of how the embodiments may be realized. The embodiments of the disclosure will be described in relation to a radio base station, although it is noted that the embodiments of the disclosure are also intended to embrace other nodes in a telecommunication network.

FIG. 2 shows a node of a telecommunication network, comprising a main processing unit 201 and a plurality of peripheral processing units 203, 205, 207, 209, 211, 213, 215, 217, 219 and 221, (for example digital signal processing units). The peripheral processing units are connected via branches in a hierarchical tree topology. It is noted that the arrangement shown in FIG. 2 is an example only, and that other configurations may be used without departing from the embodiments of the disclosure.

The main processing unit 201 accepts tasks or jobs from a queue (for example during a Radio Link Setup (RLS) in WCDMA). Some processing may be performed at the main processing unit 201, while other tasks may be passed to one or more other processing units for further handling. The tasks or jobs are terminated after a stochastic period of time, for example by order from the main processing unit (for example RLS release).

In FIG. 2 the processing unit 217, for example, is connected to the main processing 201 unit via a branch $BR1_3$. The processing unit 217 is at a lower hierarchical level than the main processing unit 201. Processing unit 217 is in turn connected to processing units 219 and 221 at a lower hierarchical level, via branches $BR2_{31}$ and $BR1_{32}$. If the temperature of a processing unit, for example processing unit 219, rises above a certain threshold, the processing unit 219 can provide a high-temperature indication, which can be used by the main processing unit when allocating tasks. The main processing unit determines the temperature status of branches in the hierarchical tree topology, wherein the temperature status of a branch is related to the temperature of a processing unit coupled to the branch. The main processing unit 201 is then able to allocate a task to one or more processing units based on the temperature status information of the various branches in the hierarchical tree topology.

The temperature status of a branch may be related to the temperature of a processing unit that is directly coupled to that branch. For example, the temperature status of branch $BR2_{31}$ can be indicated as being "high" when the temperature status of processing unit 219 becomes high. Branch $BR2_{31}$ is directly connected to the hot spot (processing unit 219).

The temperature status of a branch may optionally also be related to the temperature of a processing unit that is indirectly coupled to that branch. For example, the temperature status of branch $BR1_3$ can be indicated as being "high" when the temperature status of processing unit 219 becomes high, because processing unit 219 is connected as a leaf to branch $BR1_3$.

Similarly, the temperature status of branch $BR2_{32}$ may optionally be indicated as being "high" when the temperature status of processing unit 219 becomes high, because branch $BR2_{32}$ is connected in parallel to branch $BR2_{31}$.

In one example the main processing unit can be configured to block any tasks from being passed to any processing unit connected to branch $BR1_3$, due to the fact that this branch $BR1_3$ is ultimately connected to a processing unit 219 that has a high-temperature indication. Alternatively, tasks can be blocked further down the hierarchy, for example in branch $BR2_{31}$ when processing unit 219 becomes hot. The selection of which branches to block can depend upon a particular application, for example which tasks rely on which group of processing units. This selection of which branches to block can also vary dynamically between different tasks being allocated. For example, a task performed just at processing unit 219 may result in only branch $BR2_{31}$ being blocked, whereas a task involving processing units 219 and 221 may involve branches BR2$_{31}$ and BR2$_{32}$ being blocked, or branch BR1$_3$ being blocked upstream.

In other words, the relationship between the temperature status of a processing unit and one or more branches can vary according to different types of tasks. Depending on the type of task, a task might require a cluster of processing units (for example processing units 217, 219, 221) or only a single processing unit, for example processing unit 217. During a task allocation process it is known if a task requires a cluster of processing units (and hence branches) or single processing unit.

In the example depicted in FIG. 2, if a task requires a cluster of processing units 217, 219, 221 to be used during the processing of the task, then the branch BR1$_3$ can be set as having a high temperature status, thereby preventing any such tasks from being allocated to processing units 217, 219, 221.

Alternatively, for a task requiring only a single processing unit, no such task would be allocated to processing unit 219. However, such a task could be allocated to either the processing unit 217 or 221. In this alternative scenario, the branch BR2$_{31}$ could be set as having a high temperature status.

The system can be adapted to add attributes associated with overheating to individual nodes within the overall topology information of the network. As such, when allocating tasks, the topology model (with the temperature information included) can be used, for example, as described later in the application.

By not allocating any more tasks on a branch with an associated hot processing unit, the temperature of the hot processing unit will eventually reduce as existing tasks are completed. A processing unit may be placed in a hibernation or sleep mode when the temperature has risen above a certain threshold, or if it is connected to a branch which has been blocked (for example if another processing unit connected to that branch has become hot).

Furthermore, once the temperature of a hot processing unit is reduced below a threshold, an indication may be sent to the main processing unit, such that the associated branch or branches can be considered open for admitting new tasks once more. This aspect is based on the assumption that when jobs or tasks are no longer admitted, the processing unit (or units) will cool down, eventually. If this cooling does not occur, or the temperature rises even more, then the further step of causing a processing unit to be placed in a hibernation mode can take place. Although hibernation may lead to calls being lost during such a period, this can still be preferable than having to shut down a base station completely, for example. A separate algorithm may be provided for controlling how and when one or more processing units are placed into a hibernation mode. Further details of this are described later in the application.

FIG. 3 shows an alternative example to FIG. 2, whereby a high temperature at processing unit 311 results in tasks not being allocated to any processing units connected to branch BR2$_{21}$, i.e. branch BR2$_{21}$ being blocked.

FIG. 4 shows yet a further example, whereby a high temperature at the main processing unit 401 results in tasks not being received or allocated by the main processing unit 401. Here, new jobs or tasks are rejected until the main processing unit cools off.

It is noted that the main processing unit 201 of FIG. 2, 301 of FIG. 3, or 401 of FIG. 4 can be configured in any manner, depending on the degree to which branches and processing units are to be disabled in response to a high temperature signal.

The embodiments of the present disclosure are therefore able to control power dissipation (and as a consequence the temperature of a CPU, DSP, ASICs, or HotSpot) by controlling how tasks are allocated, or by marshalling the processing of job admittance. For example, if the temperature of a particular processing unit is high, embodiments of the disclosure can stop admitting new jobs to certain branches and/or processing units to obtain graceful degradation. The embodiments of the disclosure therefore provide a dynamic form of over temperature protection (OTP) and load distribution.

As will be described in further detail later in the application, the main processing unit comprises an algorithm for optimizing the allocation of tasks, or the pruning of branches in the tree, according to how over temperature develops in the various processing units of the node. By admitting or allocating tasks and jobs to cooler branches within the hierarchical tree topology, better key performance indicators (KPIs) can be obtained at high temperature.

By not admitting new jobs, this enables existing jobs to be kept and executed until they have been completed, rather than existing tasks or jobs being stopped mid-execution, as might otherwise happen in prior art solutions. Preventing the admission of new jobs has the advantage of dealing with over temperature in a more graceful (and user friendly) manner than conventional systems.

The mechanism for rejecting (not admitting) jobs is preferably a simple algorithm, such that it does not consume many CPU cycles itself, and hence will not contribute to the overall processing load. Examples are NBAP Radio Link setup and NBAP Radio Link Reconfiguration. In such examples, NBAP signals such as Radio Link Setup Request and Radio Link Reconfiguration Prepare can be used to inform an external user, node, or control node that no more tasks (such as calls) are to be allocated.

It is noted that the relationship between temperature and power dissipation is exponential (and is a vicious cycle). This means that if the temperature is high, then the same amount of CPU cycles will dissipate exponentially more power than in a situation where the temperature is lower (thus raising the temperature even higher). As such, controlling the temperature by controlling how tasks are allocated has the additional advantage of lowering power consumption in the node.

Figure 5:
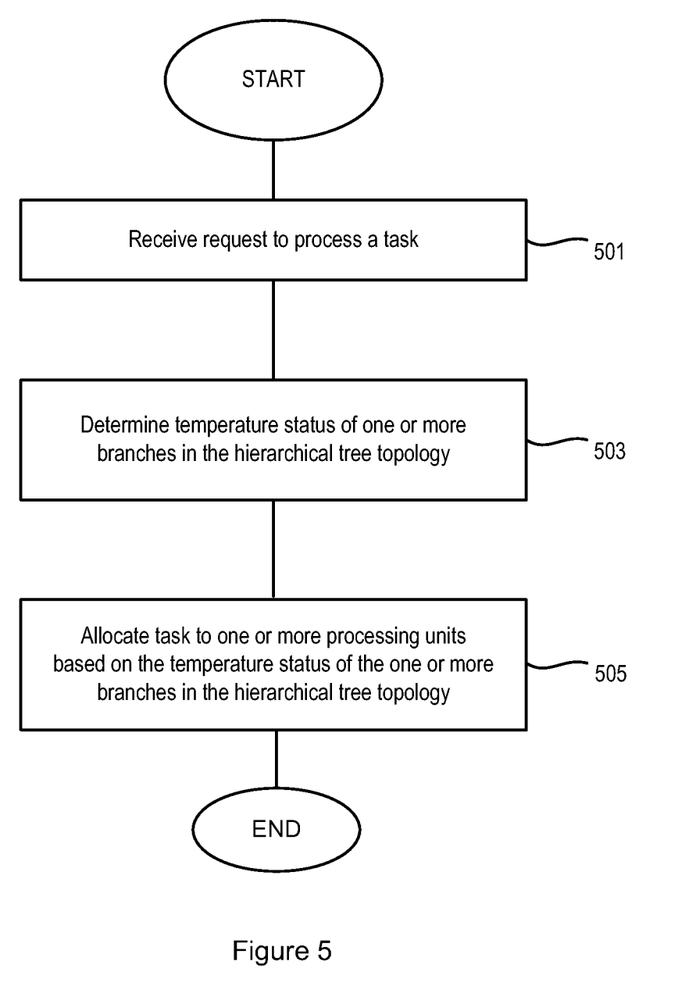
FIG. 5 shows the steps performed by a node, according to an embodiment of the present disclosure.

FIG. 5 shows a method of allocating tasks according to an embodiment of the disclosure. The method is performed in a node of a telecommunications network, for example a radio base station, the node comprising a main processing unit which is configured to process tasks in association with one or more of a plurality of peripheral processing units, the peripheral processing units arranged in a hierarchical tree topology comprising one or more branches at one or more hierarchical levels.

In step 501 the node receives a request to process a task. In step 503 the temperature status of branches in the hierarchical tree topology is determined. The temperature status of a branch is related to the temperature of a processing unit coupled to the branch. In step 505 the task is allocated to one or more processing units based on the temperature status of the branches in the hierarchical tree topology.

As mentioned above, a temperature status of a branch may be related to the temperature of a processing unit connected directly or indirectly to that branch.

Figure 6:
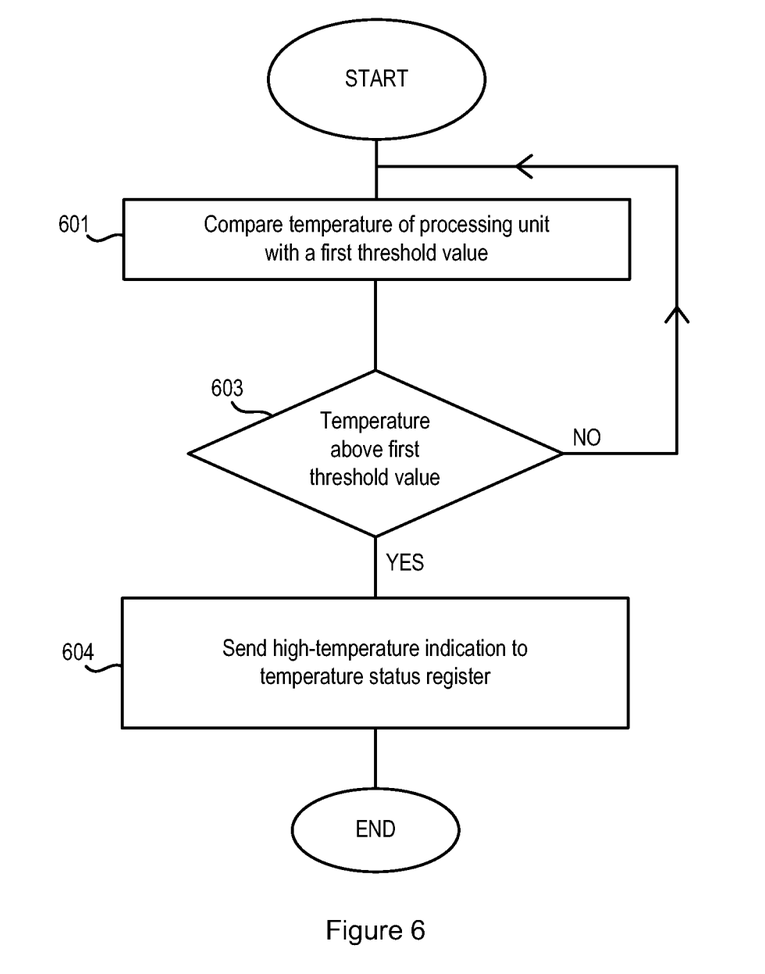
FIG. 6 shows the steps performed in a processing unit of a node, according to an embodiment of the present disclosure.

FIG. 6 shows a method according to another embodiment of the disclosure, and in particular to a method performed at a processing unit of a node of a telecommunications network, the node comprising a main processing unit which is configured to process tasks in association with one or more of a plurality of peripheral processing units, the peripheral processing units arranged in a hierarchical tree topology comprising one or more branches.

In step 601 the temperature of the processing unit is compared with a first threshold value. The temperature may be measured by a diode on chip, or by a sensor adjacent to the chip, for example. Other methods of measuring the temperature are intended to be embraced by embodiments of the disclosure. In step 603 it is determined whether the temperature of the processing unit has risen above the first threshold value. The first threshold value can be set according to a particular application, or chosen by an operator. If the temperature has not risen above the first threshold value, the processing unit continues to compare the temperature of the processing unit with the first threshold value, repeating steps 601 and 603.

If it is determined in step 603 that the temperature has risen above the first threshold value, the processing unit sends a high-temperature indication to a temperature status register, step 604. The high-temperature indication provides an indication that the processing unit forms part of a branch having a high temperature.

The high temperature indication may be used by other processing units, such as a main processing unit responsible for allocating tasks, to determine how tasks should be allocated to a plurality of processing units. In such a scenario, the main processing unit is able to consult a temperature status register to determine which processing unit or units should be avoided when allocating tasks. The temperature status register may be stored in the main processing unit, or stored in the processing unit responsible for allocating tasks. Alternatively, the temperature status register may be stored or placed elsewhere, and interrogated by the main processing unit (or by the processing unit responsible for allocating tasks). According to one embodiment, the values contained in the temperature status register may be stored in a data-model that represents the physical topology of the processing units, and can reside in the main processor software. The data-model includes the over temperature information. By placing the temperature status register in the main processor software, such an embodiment has the advantage of enabling the main processor to access such information more easily when allocating new tasks. Alternatively, the temperature status register could coexist with the network data topology, and may be synchronised periodically such that the network topology contains an up-to-date view of high temperature branches and/or processing units.

A processing unit can continue to process an existing task after sending a high-temperature signal to the temperature status register, until said existing task has been completed. Alternatively, the processing unit may be configured to end a task immediately after determining that a temperature threshold has been exceeded. This can depend on any one of a number of factors, for example the importance of the task being performed, or the importance of the particular processing unit, or some combination thereof.

Different temperature thresholds may be set for different tasks. For example, after sending a high-temperature signal, a critical task may continue until a critical temperature is exceeded, whereas an non-critical task may continue until a moderately high temperature threshold is exceeded. In other words, high-temperature signals (requesting that no more tasks be allocated) may be sent at a first threshold, and then a second threshold (a critically high temperature signal) may trigger immediate shutdown without completing the task in hand.

Figure 7:
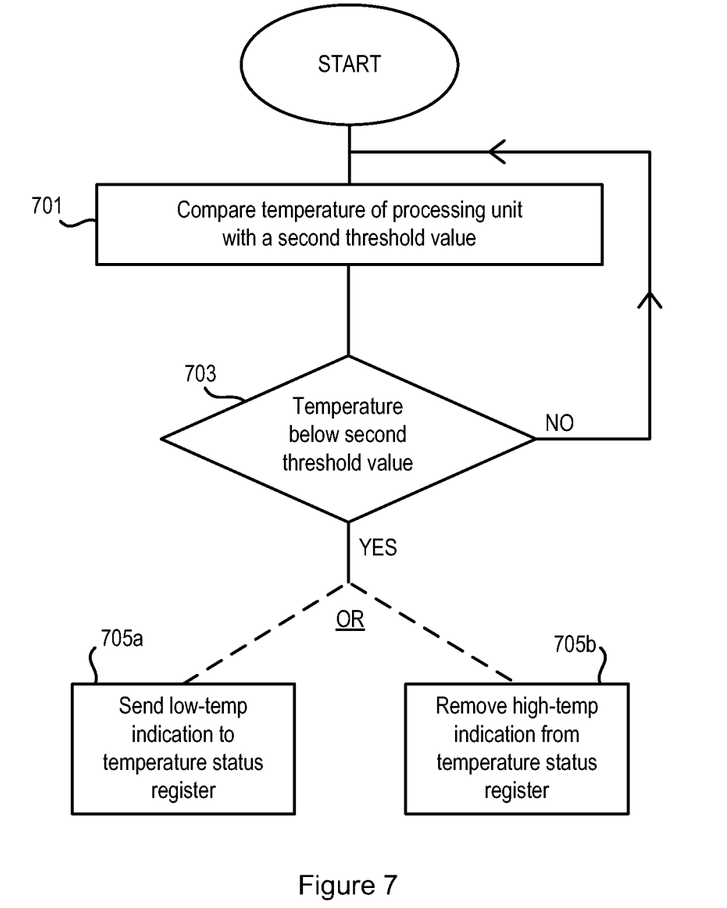
FIG. 7 shows the steps performed in a processing unit of a node, according to another embodiment of the present disclosure.

FIG. 7 shows the steps performed by an embodiment of the disclosure, for example a processing unit that is currently indicated as being a high temperature processing unit. In step 701 the temperature of the processing unit is compared with a second threshold value (a safe or restart value). In step 703 it is determined if the temperature of the processing unit has fallen below the second threshold value. If not, then the processing unit continues to perform steps 701 and 703, to determine if the temperature has fallen below the second threshold value.

If it is determined in step 703 that the temperature has fallen below the second threshold value, a low-temperature indication is sent to the temperature status register, step 705*a*. Alternatively (or in addition), a high-temperature indication held at a temperature status register can be removed, step 705*b*. This aspect of the method will depend on how the temperature status information is held at the temperature status register. For example, the temperature status register may be configured to only hold information about processing units that have a high temperature status. Alternatively, the temperature status register may be configured to store temperature information about all processing units, with a corresponding "high" or "low" status provided for each processing unit. Steps 705*a* and 705*b* can therefore be chosen accordingly. Also, these steps may simply involve changing a temperature status bit from high to low, or vice versa. Additional temperature information such as "critically high" status may be stored. Further, a task importance may be stored for each processor based upon the task currently assigned.

The temperature status register can be configured to store information about individual nodes, or information about branches, or both. According to one embodiment the temperature status register contains a table having a line per processing unit and an associated Boolean value stating if the processing unit has a high temperature or not. This status may be used in conjunction with the topology information, which can be modelled or stored elsewhere, as described above.

The first threshold value (high temperature) can be the same as the second threshold value (safe temperature). Alternatively and preferably, the first threshold value can be different from the second threshold value in order to provide hysteresis or overly frequent cycling. For example, the second threshold value may be 10 degrees lower than the first threshold value.

Figure 8:
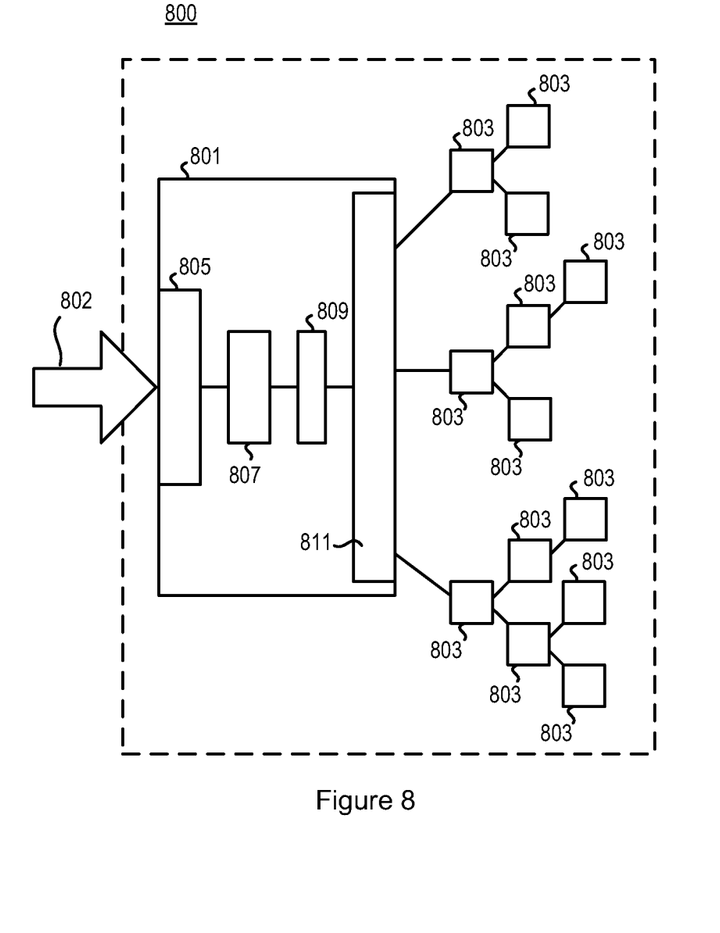
FIG. 8 shows a node according to another embodiment of the present disclosure.

FIG. 8 illustrates a node 800 of a telecommunication network, according to an embodiment of the disclosure. The node 800 comprises a main processing unit 801 and a plurality of peripheral processing units 803. The peripheral processing units 803 are arranged in a hierarchical tree topology comprising one or more branches at one or more hierarchical levels.

The main processing unit 801 comprises a receiving unit 805 for receiving a request 802 to process a task. The main processing unit 801 also comprises a selecting unit 807 adapted to select one or more processing units 803 that have processing capacity to process the task. A comparator unit 809 is adapted to determine a temperature status of the branches having a selected processing unit. An allocating unit 811 is adapted to allocate the task to one or more processing units 803, based on the temperature status of the branches.

The main processing unit 801 can be further adapted to perform the steps described above, in relation to the other embodiments of the disclosure.

The processing units in the embodiments above, for example CPUs, DSPs, and ASICs, are related in a hierarchical tree-like topology, so that specific jobs are processed partly on a main processing unit and partly on one or more peripheral processing units. In this way, if for example one of the peripheral processing units becomes hot, then processing jobs can either be directed to other branches or stopped (depending on the status of the other branches).

The embodiments of the disclosure have many advantages. For example, hardware boards can be developed whereby the components run on or near critical power consumption or temperature during simulation, without the fear that such components will fail during use.

Also, when using supply systems with limited power budget, e.g. running on solar or wind power, the allocation of tasks can be carried out to maintain the coolest possible operation, thereby enabling the available energy to be used efficiently. In other words, tasks can be allocated to avoid high temperature, and hence dissipate less power. This can be particularly useful during power outages at a base station node, when battery power has to be relied upon instead—in such situations being able to maximize the usage of the available battery energy is favorable.

Supply systems (such as the climate part) can be sized with tighter margins because the rare occasions of over temperature can be handled gracefully. If an operator chooses to not use a climate control system (such as an air conditioner) a best effort radio base station can be configured. If an operator chooses to run a base station, for example, without a conventional climate control system, such a system would normally shut down as soon as something becomes overheated. The embodiments of the disclosure have the advantage of enabling a more precise form of control, whereby a base station can stop admitting jobs or tasks to hot parts, and therefore provide a graceful degradation rather than a sudden crash. In a "green" environment or when running on solar cells, for example, this provides an advantage over prior art systems.

With regard to the sizing of a climate system, currently the air conditioning system is sized with a large safety margin, making it more costly and larger than needed. The embodiments of the disclosure enable the climate control mechanisms to be sized smaller than would otherwise be possible, thereby enabling energy savings in the climate control (fans and/or air conditioning) operating costs. For example, by simply sizing a climate control system to 99% of a previous value, it would be possible to reduce the cost of climate control accordingly, and to have a slightly reduced processing capacity through the revised task allocation during small periods which require 100% of the previous value, according to embodiments of the disclosure.

The embodiments of the disclosure may also be used with an application which allows for limited functionality in a specific temperature span (e.g. 55-60 degrees ambient temperature), whereby the over temperature protection (OTP) mechanism as described above can be used to limit functionality gracefully.

Furthermore, the embodiments of the disclosure enable systems to be sized with tighter overall margins for power dissipation and cooling, while still allowing for the same or larger margins on a component level. Also the algorithms for controlling task allocation can cater for the handling of component variance, allowing hardware designers to release boards that potentially can be too hot if ambient temperature is too high (while remaining within the required operating specification).

Those skilled in the art will recognize improvements and modifications to the preferred embodiments of the present disclosure. All such improvements and modifications are considered within the scope of the concepts disclosed herein and the claims that follow.

What is claimed is:

1. A method of allocating tasks in a node of a telecommunication network, wherein the node comprises a main processing unit which is configured to process tasks with one or more of a plurality of peripheral processing units, and the peripheral processing units are arranged in a hierarchical tree topology comprising a first level comprising a first set of the plurality of peripheral processing units coupled to the main processing unit via a first set of branches and a second level comprising a second set of the plurality of peripheral processing units coupled to the first set of the plurality of peripheral processing units via a second set of branches, the method comprising the steps of:

receiving a request to process a task;

determining a temperature status of each branch in the first and second sets of branches in the hierarchical tree topology, wherein the temperature status of a first branch in the first set of branches is related to a temperature of a corresponding first peripheral processing unit in the first set of the plurality of peripheral processing units and a temperature of each of one or more second peripheral processing units in the second set of the plurality of peripheral processing units that are coupled to the corresponding first peripheral processing unit via corresponding second branches in the second set of branches; and avoiding allocation of the task to one or more peripheral processing units of the plurality of peripheral processing units connected to or down the hierarchy from one or more branches having high temperature status.

2. The method of claim 1, further comprising directing the task to a peripheral processing unit that forms part of a branch that is indicated as having a low temperature status.

3. The method of claim 1, wherein the step of avoiding allocation of the task comprises the step of temporarily preventing the task from being allocated to a peripheral processing unit that forms part of a branch that is indicated as having a high temperature status.

4. The method of claim 1, wherein the step of avoiding allocation of the task comprises the step of delaying the admission of the task to any peripheral processing unit for processing.

5. The method of claim 1, further comprising the step of maintaining a temperature status register, wherein the temperature status register comprises a list of temperature status information for each branch in the first and second sets of branches in the hierarchical tree topology.

6. The method of claim 5, wherein the temperature status register comprises a list of branches which are indicated as having a high-temperature status.

7. The method of claim 5, wherein a branch indicated as having a high-temperature status is temporarily removed from the hierarchical tree topology.

8. The method of claim 1, further comprising the step of causing a peripheral processing unit in a high-temperature branch to be placed in a standby or sleep mode.

9. The method of claim 8, wherein the peripheral processing unit is placed in the standby or sleep mode after completing an existing task.

10. The method of claim 1, further comprising the step of receiving a power management signal for disabling at least one of the first and second sets of branches in the hierarchical tree topology.

11. The method of claim 1, wherein the step of determining the temperature status of each branch in the first and second sets of branches in the hierarchical tree topology comprises determining a temperature of a peripheral processing unit, the peripheral processing unit being one of the first peripheral processing unit and the second peripheral processing unit, the method further comprising the steps of:
- comparing the temperature of the peripheral processing unit coupled to a branch with a first threshold value; and
- determining if the temperature of the peripheral processing unit has risen above the first threshold value and, if so;
- sending a high-temperature indication to a temperature status register, the high-temperature indication indicating that the peripheral processing unit is coupled to a branch having a high temperature.

12. A method as claimed in claim 11, wherein the peripheral processing unit continues to process an existing task after sending the high-temperature indication to the temperature status register, until said existing task has been completed.

13. A method as claimed in claim 11, further comprising the steps of:
- comparing the temperature of the peripheral processing unit with a second threshold value; and
- determining if the temperature of the peripheral processing unit has fallen below the second threshold value and, if so either;
  - sending a low-temperature indication to the temperature status register indicative that the branch has a low temperature; or
  - removing the high-temperature indication of the branch from the temperature status register.

14. A method as claimed in claim 13, wherein the second threshold value is lower than the first threshold value.

15. The method of claim 1, wherein, for each branch, the temperature status of the branch is related to at least one of a group consisting of: a temperature of a peripheral processing unit directly coupled to the branch and a temperature of a peripheral processing unit indirectly coupled to the branch.

16. A node of a telecommunication network, the node comprising:
- a main processing unit; and
- a plurality of peripheral processing units, the peripheral processing units arranged in a hierarchical tree topology comprising a first level comprising a first peripheral processing unit of the plurality of peripheral processing units coupled to the main processing unit via a first branch of a first set of branches and a second level comprising one or more second peripheral processing units of the plurality of peripheral processing units coupled to the first peripheral processing unit via corresponding second branches of a second set of branches;
- wherein the main processing unit comprises:
  - a receiving unit configured to receive a request to process a task;
  - a selecting unit configured to select one or more peripheral processing units of the plurality of peripheral processing units that have processing capacity to process the task, the one or more selected peripheral processing units comprising the first peripheral processing unit;
  - a comparator unit configured to determine a temperature status of each of the first branch of the first set of branches and the corresponding second branches of the second set of branches, wherein the temperature status of the first branch of the first set of branches is associated with a temperature of the first peripheral processing unit and a temperature of each of the one or more second peripheral processing units; and
  - an allocating unit configured to avoid allocation of the task to one or more peripheral processing units of the plurality of peripheral processing units connected to or down the hierarchy from one or more branches having high temperature status.

17. A node as claimed in claim 16, wherein the allocation unit is further configured to temporarily prevent the task from being allocated to a peripheral processing unit that forms part of a branch that is indicated as having a high temperature status.

18. The node of claim 16, wherein:
- the first peripheral processing unit is associated with a first temperature sensor
- one of the one or more second peripheral processing units is associated with a second temperature sensor;
- the comparator unit is further configured to determine a first temperature status of the first branch of the first set of branches, and a second temperature status of one of the corresponding second branches of the second set of branches; and
- the allocating unit is further configured to allocate tasks to the first peripheral processing unit as a function of the first temperature status of the first branch of the first set of branches.

19. The node of claim 18, wherein the allocating unit is further configured to:
- refrain from allocating any new task to the first peripheral processing unit during a first period while the first temperature status either indicates a hot status or does not indicate a cool status; and
- allow the first peripheral processing unit to complete a first current task that is currently assigned to the first peripheral processing unit.

20. The node of claim 19, wherein the allocating unit is further configured to:
- identify a family related peripheral processing unit that is related to the first peripheral processing unit by being a parent or a sibling or a descendant of the first peripheral processing unit;
- refrain from allocating the any new task to the family related peripheral processing unit during the first period.

21. The node of claim 19, wherein the allocating unit is further configured to:
- identify a task related peripheral processing unit which is currently performing a related task that is related to the first current task of the first peripheral processing unit; and
- refrain from allocating the any new task to the task related peripheral processing unit during the first period.

* * * * *